Nov. 1, 1932. H. H. GLASIER 1,886,335
POWER SPADER
Filed July 1, 1931  3 Sheets-Sheet 2
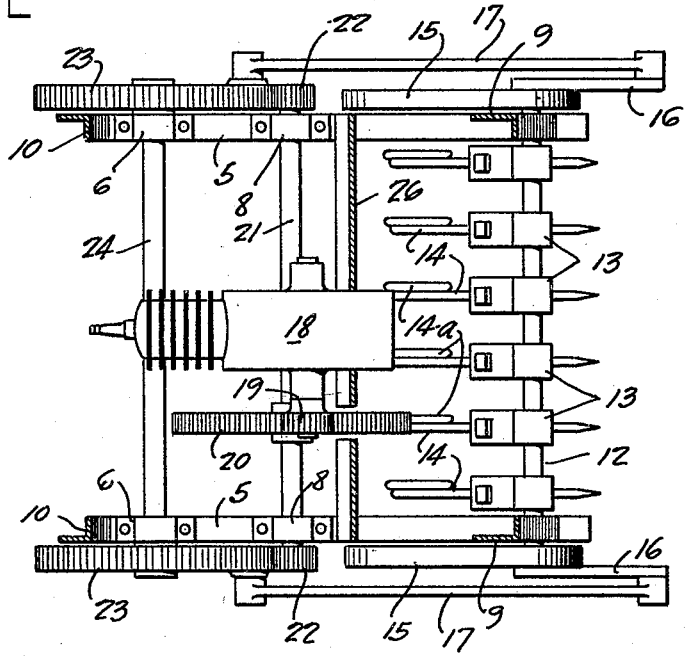
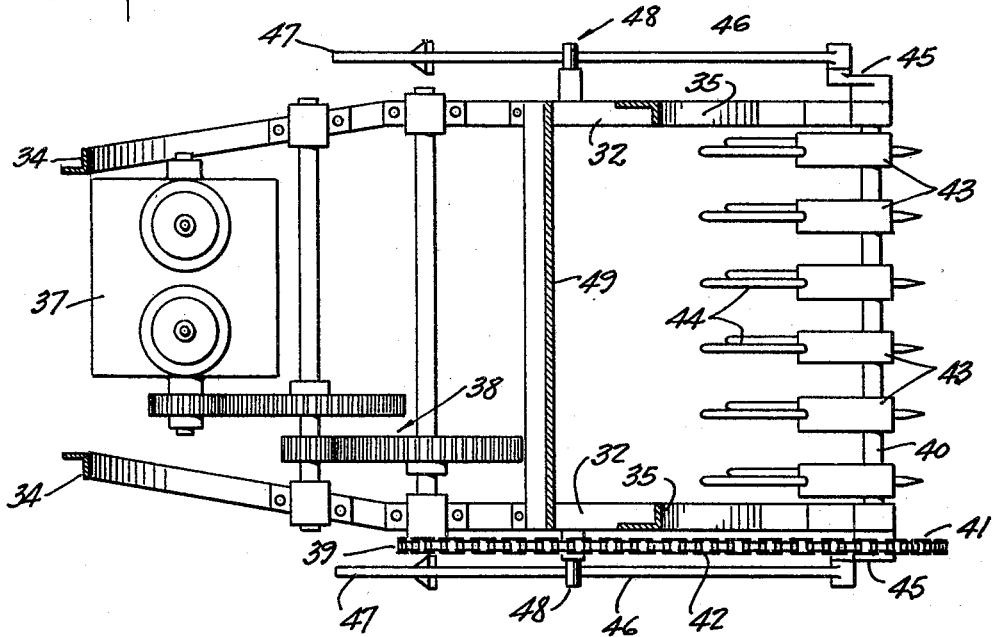
INVENTOR
Harold H. Glasier
BY
Westall and Wallace
ATTORNEYS

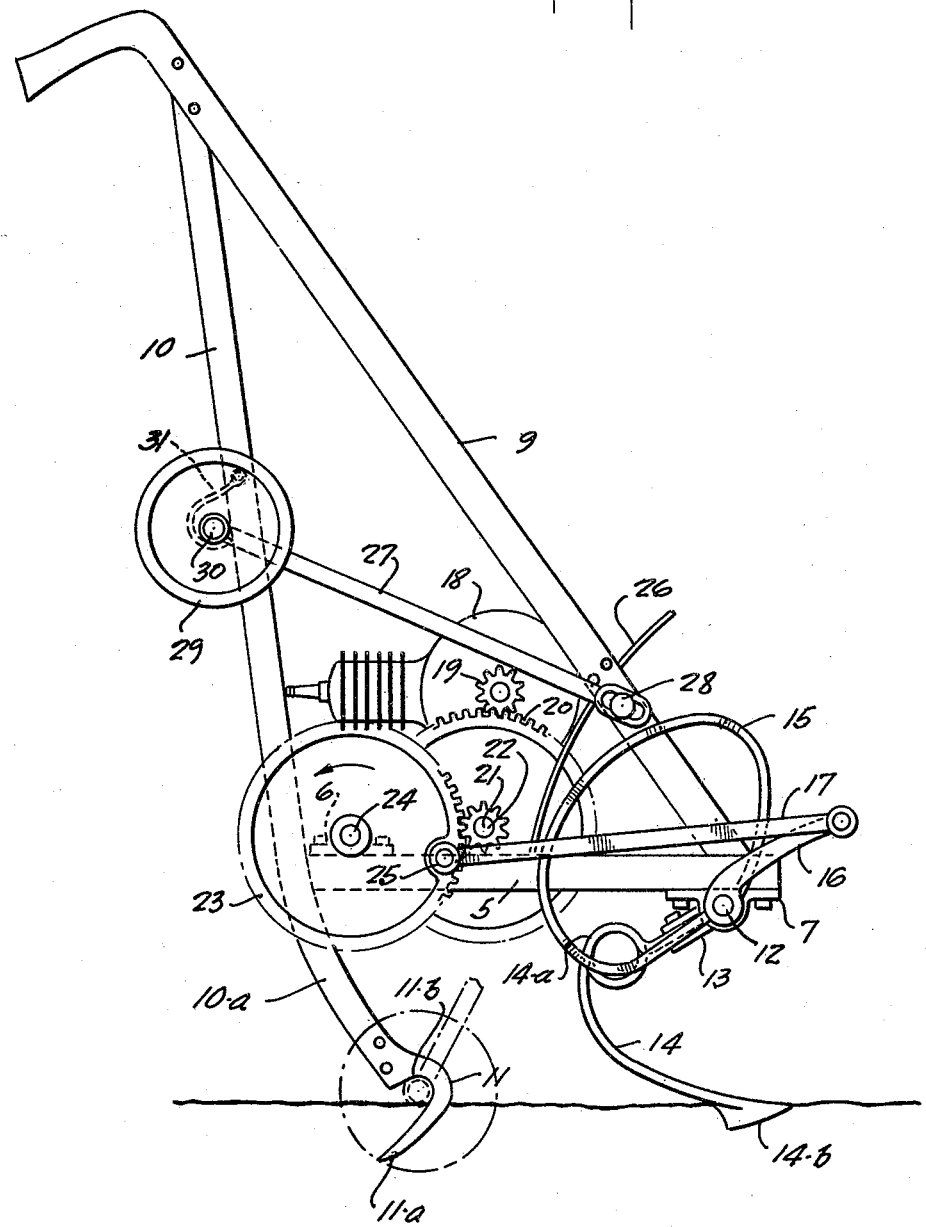

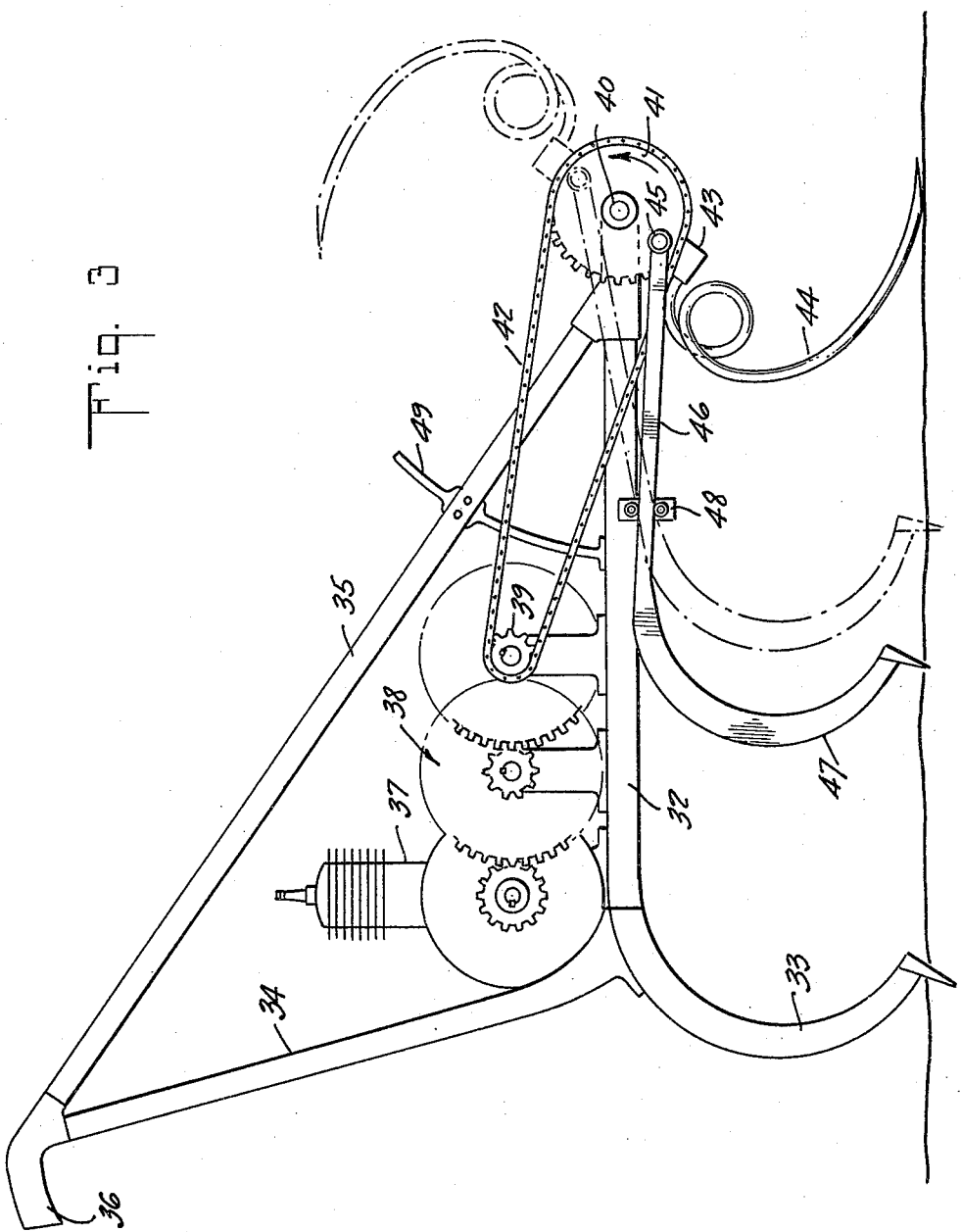

Patented Nov. 1, 1932

1,886,335

UNITED STATES PATENT OFFICE

HAROLD H. GLASIER, OF LOS ANGELES, CALIFORNIA

POWER SPADER

Application filed July 1, 1931. Serial No. 548,119.

The present invention relates to a self contained power spader for performing the functions of dividing, turning and shattering the soil. The machine requires no attention in its functioning except to guide it. All the energy required for operation is derived from a power device. It is adapted to advance itself along the ground, digging as it proceeds.

These objects together with other objects and corresponding accomplishments are obtained by means of the embodiments of my invention illustrated in the accompanying drawings, in which:

Fig. 1 is a side elevation of one form of my spader; Fig. 2 is a sectional plan view of the structure shown in Fig. 1; Fig. 3 is a side elevation of another form of my invention; and Fig. 4 is a sectional plan view of the structure shown in Fig. 3.

Referring more particularly to Figs. 1 and 2, a frame comprising side bars 5 is provided with bearing blocks 6 at the rear. At the front on the under side of bars 5 are bearing blocks 7. On each side bar intermediate the ends and on the upper side are bearing blocks 8. Extending upwardly and at an angle are guide handles 9 which are attached to the side bars at the front. Attached to the handles adjacent their hand holes and to the rear of the side bars are brace bars 10 which extend below the side bars and form the legs 10a of brace feet. At the lower end of each brace leg is a foot 11 having a rearwardly extending talon 11a and a pocket 11b.

A shaft 12 is journalled in blocks 7 and overhangs the side bars 5. Fixed to shaft 12 are spade holders 13 having sockets in which are received the shank ends of spades 14. These spades are preferably made of resilient metal and have a loop 14a for increasing their resiliency. At their lower ends, they are provided with toes 14b. Fixed to the shaft 12 outside of bars 5 are roll-over runners 15 of sled type. The spades are to be rocked by oscillation of shaft 12 so as to bring them out of the ground. The roll-overs then engage the ground and support the front end of the frame. Attached to the shaft 12 are crank arms 16. Pivotally secured to the crank arms are connecting rods 17.

Supported on the frame is a motor or engine 18 provided with a pinion 19 secured to its crank shaft. Pinion 19 meshes with a gear 20 fixed to a shaft 21 journalled in bearing blocks 8. Shaft 21 overhangs the side bars and is provided with pinions 22 meshing with gears 23 fixed to a shaft 24. Shaft 24 is journalled in bearing blocks 6. The gears 23 are crank wheels having crank pins 25 to which connecting rods 17 are secured.

In the operation of the device, the brace feet are anchored in the ground as shown in Fig. 1 and the machine guided by means of the handle 9. The motor 18 through the intermediate reduction gearing turns gears 23 and thereby reciprocates the connecting rods 17. This causes oscillation of shaft 12. The spades 14 move through an arc downwardly to penetrate the ground and acting against the resistance of the brace feet 11 move forwardly with respect to the latter, digging up the ground. After the spades have left the ground, shattering the soil and turning it over, they are swung backwardly and the toes 14b engage the ground and anchor therein. The spades are now moving toward the brace feet 11 and pull the frame and feet forwardly as the talons 11a offer no anchoring effort to forward movement. This advances the frame and the spades start forward movement down into the ground, the brace feet taking hold of the ground and anchoring therein. The result is a galloping action in the advance of the machine.

Mounted on the frame over the spades is a dirt shield or battering plate 26 against which soil is thrown by the spades when turned, thus aiding in breaking up the soil. For the purpose of moving the machine about when not digging, I have provided carrier wheels mounted upon pivoted arms 27 secured by pivot pins 28 operating in elongated slots in the arms 27. The carrier wheels are mounted upon a shaft 30 secured to the ends of arms 27. The arms 27 are of such length and the pins 28 so disposed that the arms may be swung downwardly for the shaft 30 to repose in the pockets 11b of the brace feet 11. To hold the carrier wheels in inoperative position, hooks 31 are provided, these hooks being secured to the braces 10.

Referring more particularly to Figs. 3 and 4, a frame 32 has brace legs 33 rigidly attached thereto and depending therefrom. Upstanding from the brace legs at their junctures with the frame 32 are braces 34. These braces are joined at the top by bars 35 extending to and attached to the front of frame 32. At the junctures of braces 34 and bars 35 are guide handles 36. Mounted on the frame is an engine 37 connected by intermediate gearing indicated generally by 38 to a sprocket pinion 39. Journalled in bearing blocks at the front of the frame is a shaft 40 having a sprocket wheel 41 geared to sprocket pinion 39 by a sprocket chain 42. By means of the engine and gearing, the shaft 40 is rotated.

Mounted upon shaft 40 are spade holders 43 for carrying spades 44. In the construction just described, the spades are revolved in the direction indicated by the arrow on wheel 41 in Fig. 3. The movement of the spades 44 with respect to the brace feet 33 when penetrating the ground is away from the brace feet and there is no backward oscillating movement which would advance the machine. To the end that the machine may be advanced, I have provided steppers. Fixed to shaft 40 are crank arms 45. Connected to crank pins on arms 45 are rearwardly extending legs 46 of the steppers. The steppers 47 are in general of the form of the brace feet. Legs 46 are guided in roller supports 48 mounted upon the frame 32. The construction is such that as the spades 44 penetrate and shatter the ground, the steppers 47 are moved from the ground and forwardly to the position shown by dotted lines in Fig. 3. As the spades leave the ground and move upwardly, the steppers are moved downwardly into the ground and toward the brace feet, pulling the frame forwardly. The steppers serve to support the frame at its forward end when the spades are out of the ground and also advance the frame. The construction just described is also provided with a dirt shield or shatter plate 49.

What I claim is:—

1. A power spader comprising in combination: a frame; a foot depending therefrom for anchoring in the ground against rearward movement; a spade movably mounted on the frame for movement through an arc with its toe along the ground in relation to said foot so as to be initially projected into the ground, moved away from the foot, to be lifted from the ground and returned to its initial position; and power actuated means mounted on said frame to move said spade.

2. A power actuated spader comprising in combination: a frame; a foot depending therefrom having a rearwardly directed talon at its lower end; a spade pivotally mounted on said frame and spaced forwardly of said foot, said spade having a forwardly directed toe; and power actuated means to cause said spade to be moved in relation to said foot to initially penetrate downwardly into the ground and be moved forwardly, then to be finally lifted therefrom and returned to its initial position.

3. A power actuated spader comprising in combination: a frame; a foot depending therefrom for anchoring in the ground against rearward movement; a spade pivotally mounted on said frame in advance of said foot; power actuated means to cause said spade and foot to be moved relatively to and from each other, said spade following an arcuate path at its toe so as to be initially swung toward and into the ground, away from said foot lifted from the ground and returned to its initial position; and steppers engaging the ground after advance forwardly through the ground of said spade to advance said frame and foot.

4. A power actuated spader comprising in combination: a frame; a foot depending therefrom for anchoring in the ground against rearward movement; a spade pivotally mounted on said frame forward of said foot; power actuated means to oscillate said spade to produce a motion in relation to said foot with its toe following an arcuate path so as to initially penetrate the ground, be moved away from said foot, to be lifted from the ground and restored to its initial position; and a sled runner connected with said spade to be oscillated therewith and to engage the ground when said spade is lifted and thereby support said frame.

5. A power actuated spader comprising in combination: a frame; means on said frame to guide the latter; a rigid brace foot depending therefrom for anchoring in the ground against rearward movement; a spade pivotally mounted on said frame in advance of said foot; power actuated means to cause said spade and foot to be moved relatively to each other, said spade having an arcuate motion at its toe to be initially swung toward and into the ground and away from said foot to be lifted from the ground and restored to its initial position; and steppers forwardly disposed with relation to said foot for engaging the ground after advance forwardly through the ground of said spade to advance said frame and foot.

6. A power actuated spader comprising in combination: a frame; a foot depending therefrom having a rearwardly directed talon at its lower end; a spade having a resilient shank pivotally mounted on said frame and spaced forwardly of said foot, said spade having a forwardly directed toe; and power actuated means to cause said spade to be moved away from said foot and in its forward movement to initially penetrate downwardly into the ground, then to be lifted therefrom and restored to its initial position.

In witness that I claim the foregoing I have hereunto subscribed my name this 18th day of June, 1931.

HAROLD H. GLASIER.